2,927,937
PREPARATION OF ALKYL ORTHOSILICATES BY ATTRITION MILLING

John M. Gaines, New York, N.Y., assignor to Union Carbide Corporation, a corporation of New York No Drawing. Application April 26, 1955
Serial No. 504,093

6 Claims. (Cl. 260—448.8)

This invention relates to a method for the preparation of alkyl orthosilicates. More particularly, it is concerned with the preparation of ethyl orthosilicates by attrition milling.

Alkyl orthosilicates are of industrial importance mainly as intermediate compounds. A partially condensed product formed by adding a calculated minimum quantity of water to an alcohol-ethyl orthosilicate solution finds extensive use in the "Lost Wax" precision casting method.

Currently alkyl orthosilicates are produced by reacting an alkyl alcohol with silicon tetrachloride. Thus, ethyl orthosilicate is produced on a large scale from the reaction of silicon tetrachloride with ethyl alcohol. In this process a large volume of corrosive hydrogen chloride is released, rendering the reaction unattractive.

It is accordingly among the objects of this invention to overcome the above and related difficulties encountered in prior art methods of obtaining alkyl orthosilicates.

A further object is to prepare alkyl orthosilicates from monohydroxy and polyhydroxy alcohols and silicon by attrition milling.

A more specific object is to prepare ethyl orthosilicate in appreciable yield by the catalyzed reaction of ethyl alcohol and silicon.

Broadly construed, the invention comprises reacting silicon metal with linear lower alkyl alcohols under attritive influence to form alkyl orthosilicates. Optionally, in the case of monohydroxy alcohols a suitable catalyst such as ammonia gas can be employed. The impact action of the metallic balls used in attrition milling removes any silica which forms on the silicon surface. This attritive effect enables the surface of the silicon to remain activated, and consequently the same continues to react with the given alcohol. Attrition milling is provided herein either vibrationally or rotationally with respect to the reaction vessel axis.

The reaction subject of the present invention can be summarized by the following equation:

$$Si + 4\ ROH \rightarrow Si(OR)_4 + 2\ H_2$$

Several sources and types of silicon metal are suitable in the practice of this invention. A typical analysis of a material which has given excellent results is as follows: Found=Si, 61.9%; Fe, 11.1%; Cu, 13.4%; C, 6.7%; H, 0.5%; and Cl, 3.01%. Also suitable are ferrosilicon alloys having a percentage of from 95 to 99 percent silicon. Regardless of the composition of the material, pretreatment of silicon metal by washing, for example, with concentrated hydrofluoric acid is entirely unnecessary.

In general, where monohydroxy alcohols are reacted, an alkaline catalyst is desirable. Ammonia gas has been found the most suitable catalyst in this reaction. Sodium ethoxide, potassium hydroxide, ammonium bifluoride, dicyandiamide and a mixture of dicyandiamide with ammonia also were found effective. Catalyst concentration should be from 5 to 15 weight percent, or 0.05 to 0.25 mole fraction, based on weight or moles of alcohol used, respectively.

Several factors influence the attritive action of rotational ball milling. As far as speed of rotation relative to container axis is concerned, mills are generally run at 65 percent to 70 percent of the critical speed for fine weight grinding in viscous suspensions. The calculated critical speed for a six inch mill with balls whose diameter is less than one inch is about 50 r.p.m. This gives 32 r.p.m. as the operating speed.

Bulk volume of steel balls ranging from 20 percent to 50 percent of the capacity of the mill were found to be most suitable with a bulk volume of 30 percent to 40 percent being preferred.

With respect to shape and size of the grinding media, calculations indicate that for a charge of particle size between 32 and 200 mesh (0.0195 inch), a ball diameter of about one inch is optimum. In the equation $D_{ball}^2 = KD \times part$, a value of 50 for K was taken to represent the hardness of silicon. Where fine particles are desired, balls smaller than this figure are needed. For most reactions a size ranging from $^{11}/_{16}$ inch to $\frac{1}{2}$ inch diameter is convenient.

Vibration ball milling which is the preferred away of providing the attritive action necessary for the instant process consists in vibrating the reaction vessel and its contents about 1700 times per minute. In this manner the inner steel balls vibrate relative to the silicon metal and keep it in the active state.

A convenient method of expressing the weight ratio of charge to grinding media is by means of the ratio of the volume of the charge to the volume of the voids, this latter volume being approximately 38 percent of the bulk volume of the grinding media. In practice, the weight ratio of charge to grind media can be varied between one and five.

Another factor which influences the reaction is the ratio of solid charge to liquid. Where feasible, equal weights of silicon and alcohol should be used.

Since the reaction is usually carried out above the boiling point of the starting alcohol, a closed vessel is necessary. As high autogenous pressures are produced by the alcohol and ammonia vapors and gases, presumably hydrogen produced in the reaction, a pressure ball mill is the type of vessel best suited for this reaction. Such a vessel can easily be modified to allow the high gas pressure to be bled off gradually as non-condensibles by placing a reflux column above the ball mill to condense vapors.

In order for proper ball mill action to take place, a solid-liquid state should exist in the mill. Accordingly the upper temperature limit is the critical temperature of the reacting alcohol. In the case of ethyl alcohol, a temperature range of 150° C. to 170° C. was found to be preferred. In general it may be said that the ball mill must be above room temperature, and below 200° C. To maintain a slurry during grinding, the temperature must be kept below 243° C., the probable critical temperature of ethyl alcohol.

The method of the invention will be described with particular reference to the preparation of ethyl orthosilicate, it being understood that its application is not limited thereto. Actually, the method of the invenion is broadly applicable to the reaction of silicon with many other monohydric and polyhydric alcohols, including methyl alcohol, butyl alcohol, propyl alcohol and glycerol.

Example I

Twenty-eight grams of silicon metal (99 percent pure), 90 grams of absolute ethyl alcohol and approximately 50 stainless steel balls (0.5 inch diameter) were placed in a 300 ml. standard high pressure autoclave, bringing the total volume of the charge to about 150 ml. This vessel was sealed and fitted with a pressure gage. The vessel was mounted horizontally in an electric furnace and heated to 160° C., while rotating at 32 r.p.m. After 88 hours the rotation was stopped, and the vessel cooled to room temperature. The residual pressure reading was 600 pounds per square inch. After releasing the gas, the mixture was transferred from the vessel to a Buchner funnel. The stainless steel balls were picked out, and the slurry filtered. The solid residue was washed several times with alcohol, the washings being combined with the original filtrate. The alcohol was separated from the filtrate by heating up to 150° C. A single distillation at 165° C. yielded a liquid having a refractive index of 1.3817 at 25° C. (Ethyl orthosilicate has a refractive index of 1.3821 at 20° C.) The yield was three grams, giving a rate of production of 3.2 g./cu. ft./hr.

*Example II*

Using the same type of equipment, the above was repeated, this time using absolute ethyl alcohol saturated with ammonia gas at one atmosphere pressure. This time the reaction was complete in 5.5 hours, and the rate of production was 103 g./cu. ft./hr.

*Example III*

The procedure of Example II was repeated using the copper-silicon material hereinabove described and n-propyl alcohol. The vessel was heated to 185° C., and the reaction stopped after two hours. The rate of production of propyl orthosilicate was 175 g./cu. ft./hr.

*Example IV*

The procedure of Example II was repeated with the above-described copper-silicon material and n-butyl alcohol. The temperature of reaction was 196° C. and the time seven hours. The rate of production of butyl orthosilicate was 25 g./cu. ft./hr.

*Example V*

A steel container (5 inches in diameter and 5 inches long) was filled to within one inch from the top with stainless steel balls (mostly ¾ inch diameter, some ½ to ⅜ inch diameter). The container was then charged with 56 g. silicon metal (95 weight percent silicon; 60 to 80 mesh) and 228 ml. (180 g.) of absolute ethanol. The container cover which was equipped with two ¼ inch gate valves was then attached to the container. One gate valve was attached to a 100 p.s.i. gage. Ammonia gas was then introduced to the container to saturate the ethanol at atmospheric pressure and room temperature. The container was sealed and strapped into a vibrator. The container was supported on a strip of spring steel which was in turn connected to a revolving rod. The rod was rotated at 1700 r.p.m. by an eccentric driving mechanism which imparted up to 1700 vibrations per minute to the spring and thus to the container. This vibration or attrition reaction was continued at room temperature for one hour during which time the autogenous pressure rose to 16 p.s.i.g. The container was vented and allowed to stand overnight. The container was again sealed and vibration continued for seven hours. During this time the pressure rose to about 19 p.s.i.g., and was vented four times. The total pressure rise was about 92 p.s.i.g. 2.92 g. of product was distilled by use of a Vigreaux column under reduced pressure.

In the examples given above anhydrous alcohol has been indicated. Even small amounts of water above 0.2 percent are to be avoided in this reaction, since water may react to form partially condensed orthosilicates.

While, as indicated, higher silicates may be prepared by this method, its main advantage lies in affording an easy and economical way of preparing ethyl orthosilicates, from which higher silicates may be prepared simply by transesterification.

What is claimed is:

1. A method of producing alkyl orthosilicates, which comprises reacting under anhydrous conditions, equal amounts of silicon and of an aliphatic alcohol, together with from 5 percent to 15 percent by weight of said alcohol of at least one alkaline catalyst selected from the group consisting of sodium ethoxide, potassium hydroxide, ammonium bifluoride, ammonia, and dicyandiamide; maintaining the reaction temperature above room temperature, but below the critical temperature of said alcohol, such that a liquid phase be present, and maintaining active the surface of said silicon by subjecting the same to attrition milling.

2. A method according to claim 1, wherein said attrition milling is provided by grinding said reactants in a ball mill.

3. A method of preparing ethyl orthosilicates, which comprises reacting under anhydrous conditions silicon and ethyl alcohol, together with from 5 percent to 15 percent by weight of said ethyl alcohol of at least one alkaline catalyst selected from the group consisting of ammonia, potassium hydroxide, dicyandiamide, sodium ethoxide, and ammonium bifluoride at a temperature between the boiling point of said alcohol, and less than 240° C., and maintaining active the surface of said silicon by subjecting the same to attrition milling.

4. A method of producing n-propyl orthosilicate, which method comprises reacting under anhydrous conditions equal amounts of silicon and n-propyl alcohol, together with from 5 percent to 15 percent by weight of said alcohol of at least one alkaline catalyst selected from the group consisting of ammonia, potassium hydroxide, dicyandiamide, sodium ethoxide and ammonium bifluoride at a temperature between room temperature and below the critical temperature of said alcohol, while maintaining active the surface of said silicon by subjecting the same to attrition milling.

5. A method of preparing n-butyl orthosilicate, which method comprises slurrying under anhydrous conditions, equal amounts of silicon and n-butyl alcohol at least one alkaline catalyst selected from the group consisting of ammonia, potassium hydroxide, dicyandiamide, sodium ethoxide and ammonium bifluoride and at a temperature above room temperature, but below the critical temperature of said alcohol, while maintaining active the surface of said silicon by subjecting the same to attrition milling.

6. A method of producing ethyl orthosilicates, which comprises slurrying silicon with ethyl alcohol in the absence of water at a temperature above room temperature up to 243° C. with from 5 percent to 15 percent by weight of said alcohol of at least one alkaline catalyst selected from the group which consists of ammonia, potassium hydroxide, dicyandiamide, sodium ethoxide and ammonium bifluoride, and subjecting said silicon to attrition milling.

References Cited in the file of this patent

UNITED STATES PATENTS

| | | |
|---|---|---|
| 2,380,995 | Rochow | Aug. 7, 1945 |
| 2,389,931 | Reed | Nov. 27, 1945 |
| 2,449,821 | Sellers et al. | Sept. 21, 1948 |
| 2,473,260 | Rochow | June 14, 1949 |